Feb. 13, 1962 R. H. BLUMBERG ET AL 3,021,434
LOW TEMPERATURE CURRENT SWITCH
Filed March 25, 1958
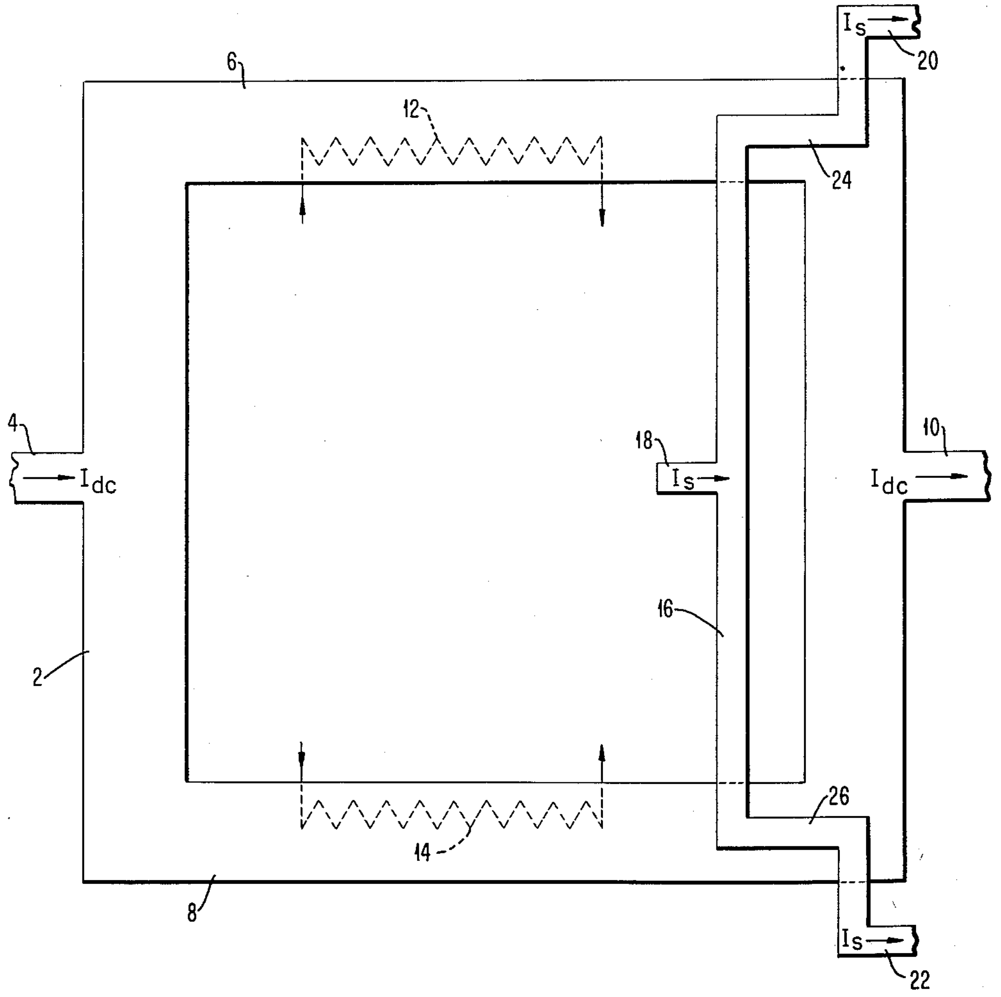
INVENTORS
REX H. BLUMBERG
CHARLES J. KRAUS
BY George Baron
ATTORNEY United States Patent Office 3,021,434

Patented Feb. 13, 1962

3,021,434

LOW TEMPERATURE CURRENT SWITCH

Rex H. Blumberg, Wappingers Falls, and Charles J. Kraus, Poughkeepsie, N.Y., assignors to International Business Machines Corporation, New York, N.Y., a corporation of New York Filed Mar. 25, 1958, Ser. No. 723,682

2 Claims. (Cl. 307—88.5)

This invention relates to switching devices, and more particularly to those switching devices employing superconductors.

The properties and characteristics of superconductors have been treated in such texts as "Superfluids" volume 1 by Fritz London, published in 1950 in New York by John Wiley and Sons, Inc. and "Superconductivity" by D. Shoenberg, published in 1952 in London by the Cambridge University Press. In general, a superconductor is a metal, an alloy or a compound that is maintained at very low temperatures, i.e., from 17° Kelvin to the practical attainability of absoluto zero, in order that it may present no resistance to current flow therein. It was discovered that in the case of mercury its electrical resistance decreased as a function of decreasing temperature until at a given temperature (about 4.12° K.) the resistance very sharply vanished, or its measurement was too small to be detected. The temperature at which the transition to zero resistance took place in mercury was referred to as its critical temperature; its state, upon reaching zero resistance, was that of a superconductor.

The critical temperature varies with different materials and for each material it is lowered as the intensity of the magnetic field around the material is increased from zero. Once a body of material is rendered superconductive, it may be restored to the resistive or normal state by raising the temperature of the body beyond its critical temperature. The body of material remains in its resistive state so long as it is maintained at or beyond its critical temperature. This temperature-resistance characteristic of superconductors is exploited in the present invention to attain a fast switching circuit wherein one may obtain a bistable device having wide utility wherever superconductive devices are employed.

The device carrying out the invention comprises two parallel current paths that are maintained in a superconductive state. Current is initially established to flow entirely through a first superconductive path. Associated with each of the parallel paths is a resistive element, such resistive element being in heat conducting relationship with its associated superconductive path. When it is desired to switch the current flowing from the first conducting path to the second non-conducting path (one that does not have current flowing in it), the resistive element in heat conducting relationship, with the first superconducting path is pulsed with an electric current, the resistor acting as a heat generator that drives the superconductive path to its normal state. Such transition from superconductive state to normal state causes the entire current to switch to the path in parallel with the path in transition. Once the heat has dissipated, the first path returns to its superconducting state, but the entire current flows only in the second path. The inductance of both paths in parallel is made very small so that the time constant $$\frac{(L)}{R}$$

can be made very small. The speed of the device is dependent on, first, the rate of switching of the current from one leg to the other and, secondly, on the rate at which the heat is dissipated in the leg that has been made resistive, since the heat relaxation time determines the waiting period before current can be reset into the leg. Moreover, a relatively large current in a superconductive path may be controlled by a small current employed in pulsing the resistor.

Consequently, it is an object of this invention to obtain a fast switching element employing superconductive elements.

It is a further object to provide a fast superconductive switching circuit that responds to thermal changes rather than magnetic field changes.

It is yet another object to attain amplification utilizing the switching characteristics of the instant invention. Other objects will be pointed out in the following description and claims and illustrated in the accompanying drawings which disclose, by way of example, the principles of the invention and the best modes which have been contemplated of applying those principles.

The sole FIGURE of the drawings is a showing of a low temperature switch wherein 2 is a superconductive film of lead, tantalum, or any suitable element, compound or alloy, that is deposited on a suitable insulating but heat-conducting substrate such as glass, silicone monoxide, magnesium fluoride and the like. Film 2 has an input terminal 4 that is connected to a suitable source of D.C. (not shown), two parallel high critical field superconductor current paths or branches 6 and 8, and a D.C. return terminal 10. Each branch 6 and 8 is provided with a resistive element 12 and 14, respectively, such resistive element lying under the substrate, or being deposited upon such substrate support so as to be electrically insulated from its associated branch 6 or 8 but in heat-conducting relationship therewith. The resistive elements 12 and 14 need not be, preferably are not, superconductors. When superconductive elements are used for elements 12 and 14, the self-current carried by each of such elements would be selected to be high enough to drive each element resistive so as to raise the latter's temperature as well as the temperature of branch 8 to their respective resistive states.

Winding 16 is a sense winding for detecting which branch, 6 or 8, is carrying current. Sense winding 16 has an input terminal 18 and two output terminals 20 and 22, wherein section 24 of the sense winding 16 is a soft superconductor and lies above or below branch 6, and section 26 of sense winding 16 is another soft superconductor that lies above or below branch 8. An electrically insulated layer insulates branches 6 and 8 from sense winding 16. It is understood in the description that follows that a soft superconductor is one that has a smaller critical current or critical field for changing its state, namely, from that of a superconductive element to one having normal resistive characteristics, whereas a hard superconductor is one that requires a higher critical current or critical field for changing from the superconductive state to its normal resistive state.

The entire configuration shown in the sole figure is immersed in a bath of liquid helium or similar refrigerant so that all the superconducting elements are maintained below their critical temperatures. Direct current $I_{dc}$ flow is initiated through one branch, branch 6 for example, by sending a driving pulse through resistive element 14 at the time that terminals 4 and 10 are connected to such D.C. source. Such driving pulse for resistive element 14 may come from any source of electrical energy, such source being represented by battery 28 and switch 30. In a similar manner, the electrical energy source for element 12 is represented by battery 32 and switch 34. It is understood that any other suitable source for applying pulses to elements 12 and 14 may be employed. The $I^2R$ heat produced by the resistive element 14 momentarily heats up the area of branch 8 immediately adjacent such resistive element 14 so as to drive the hard superconductor branch 8 to its normal resistive state. The direct current entering terminal 4 sees branch 8 as an infinite impedance compared to that of branch 6 so that the entire current passes through branch 6. When the driving pulse through resistive element 14 has terminated and the temperature of the hard superconductive branch 8 has relaxed to below its critical temperature, the latter branch 8 returns to its superconductive state. However, the energy considerations of the circuit are such that there are no forces available to make the direct current $I_{dc}$ divide between branches 6 and 8 once all the current $I_{dc}$ has been switched to branch 6 in the aforementioned manner, and branch 8 returns to its superconductive state.

When it is desired to switch the current flowing in branch 6 to branch 8, then resistive element 12 is pulsed to drive its corresponding branch 6 resistive, causing the entire current $I_{dc}$ to switch to branch 8, the latter carrying all of $I_{dc}$, even upon the return of branch 6 to its superconductive state. For binary computer applications, the presence of current $I_{dc}$ in branch 6 could represent the storage of a "1" and the presence of the same current in branch 8 could represent the storage of a "0." If the hard superconductor branch 6 is carrying all of current $I_{dc}$, the latter current $I_{dc}$ is not sufficient to drive such hard superconductor branch beyond its critical field, but the magnetic field created by the presence of such $I_{dc}$ in branch 6 exceeds the critical field for the soft superconductive section 24 that lies in branch 6. Thus the section 24 is driven to its normal resistive state while branch 6 is in its current-carrying state. When a sense current $I_s$ is applied to terminal 18, it will see section 24 of sense winding 16 as an infinite impedance compared to that of section 26 so that all of the current $I_s$ will flow out through terminal 22. If branch 8 is the current-carrying path, then sensing current $I_s$ will appear only at terminal 20. A sensing of current at terminal 20 will indicate the presence of a "0" ($I_{dc}$ flowing in branch 8) and a sensing of current at output terminal 22 will indicate the presence of a "1" ($I_{dc}$ flowing in branch 6).

In the instant switching device, the switching is initiated by a thermal generator rather than by a magnetic field generator. Since the inductance L of either branch 6 or 8 is small, the time constant $$L/R$$

can be made very small. The speed of switching from one state to another and back again, or its pulse-repetition rate, is limited by the time it takes for a resistive element 12 or 14 to reach a temperature sufficient to heat its associated superconductive branch beyond the latter's critical temperature to permit switching of $I_{dc}$ from one branch to another, determined by $$L/R$$

time constant, and the time it takes for the resistive branch to return to its superconductive state. This return to the superconductive state automatically resets the swich. The speed of switching is of the order of $0.5\mu$ seconds and could be improved by a discriminative selection of the substrate for the superconductive layers 6 and 8.

A thermal generator for effecting switching in a superconductive device is preferred to other means of switching, i.e., a magnetic field generator, because at the very low temperatures at which the switching elements are maintained, namely, 4.2° K. or less, the specific heat of substances goes down. Consequently, very little heat is needed to drive a superconductor to its critical temperature. Moreover, hard superconductors are more easily driven to their normal resistive states by the application of heat than by the application of a magnetic field. Yet another advantage of employing a thermal generator lies in the fact that a larger area of a given superconductor will go normal resistive when a localized area of the superconductor is heated beyond its critical temperature than when the same localized area is subjected to its critical magnetic field. Since the branches 6 and 8 are very thin, of the order of 1000 Angstroms thick and about 50 mils wide, one may control about five amperes of current flowing in a branch with a current pulse of about 500 milliamperes or less being applied to a resistive element 12 or 14, thus amplification is obtained.

What is claimed is:

1. A switching element comprising in combination a first hard superconductive path and a second hard superconductive path in electrical parallel with said first path, a source of direct current common to both paths wherein only one superconductive path carries the entire direct current, means for diverting said direct first current from the current-carrying path to the other path comprising a resistive element lying in electrically-insulated but heat-conducting relationship with said current-carrying path, means for selectively pulsing said resistive element with a source of electrical energy so as to momentarily heat such resistive element sufficient to drive its associated superconductive path normal resistive, whereby said direct current will switch to flow only through said other path and stay there until driven back to said first parallel path.

2. A switching element as defined in claim 1 wherein the heat relaxation time of the initial current-carrying superconductor is sufficiently long to permit said direct current to switch to said other path, whereby the return of said initial current-carrying superconductor to its superconductive state will not divert any of said direct current from said other path.

References Cited in the file of this patent

UNITED STATES PATENTS

| | | |
|---|---|---|
| 2,189,122 | Andrews | Feb. 6, 1940 |
| 2,533,286 | Schmitt | Dec. 12, 1950 |
| 2,666,884 | Ericsson et al. | Jan. 19, 1954 |
| 2,832,897 | Buck | Apr. 29, 1958 |